L. M. WOOD.
AUTOMOBILE LAMP.
APPLICATION FILED OCT. 30, 1915.

1,206,492.

Patented Nov. 28, 1916.

Inventor
Lawrence M. Wood
By
Kerr, Page, Cooper
& Hayward, Attorneys

UNITED STATES PATENT OFFICE.

LAWRENCE M. WOOD, OF FAIRFIELD, CONNECTICUT.

AUTOMOBILE-LAMP.

1,206,492.

Specification of Letters Patent.

Patented Nov. 28, 1916.

Application filed October 30, 1915. Serial No. 58,757.

*To all whom it may concern:*

Be it known that I, LAWRENCE M. WOOD, a citizen of the United States, residing at Fairfield, in the county of Fairfield, State of Connecticut, have invented certain new and useful Improvements in Automobile-Lamps, of which the following is a full, clear, and exact description.

The improvements which constitute the invention upon which is based the present application for letters patent are in connection with automobile electric lamps and reflectors, and are designed to render such devices more available for general use, more convenient of operation, and more economical than those heretofore in use.

Generally described, the features of novelty reside in a reflector adapted to be attached to the body or frame of a car by swiveled joint, whereby it may be set or turned to different angles as occasion may require, and provided at its central rear portion with a projection that serves the twofold purpose of a handle that may be grasped by the driver or other occupant of the car for ready and easy adjustment to the desired position, and also as a receptacle or container for a lamp switch.

The switch is of improved construction, the details of which will be more fully explained, and it is associated with a lamp socket of improved construction and as a further feature of utility there is a mirror secured to or set in the rear part of the casing of the reflector, in which the driver of the car may see reflected any object in the road behind him.

The details of the device have been worked out with great care to meet conditions that experience has shown to be very important and necessary, and in these the invention mainly resides. Their construction and mode of operation, it is believed, may best be gathered and understood from the specific description thereof contained in the subjoined specification in which I refer to the accompanying drawing of the device.

Figure 1:
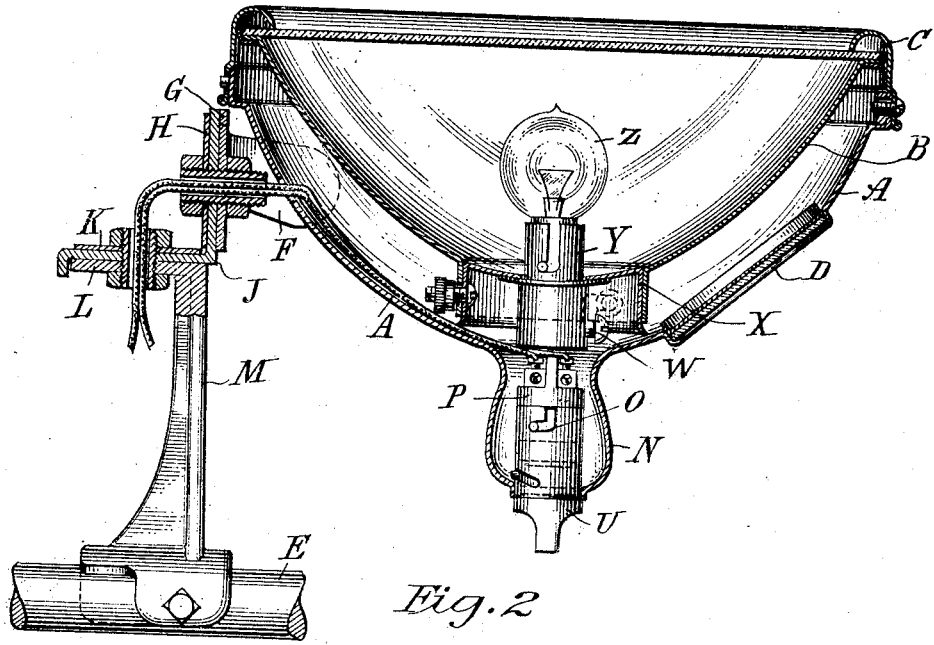
Figure 2:
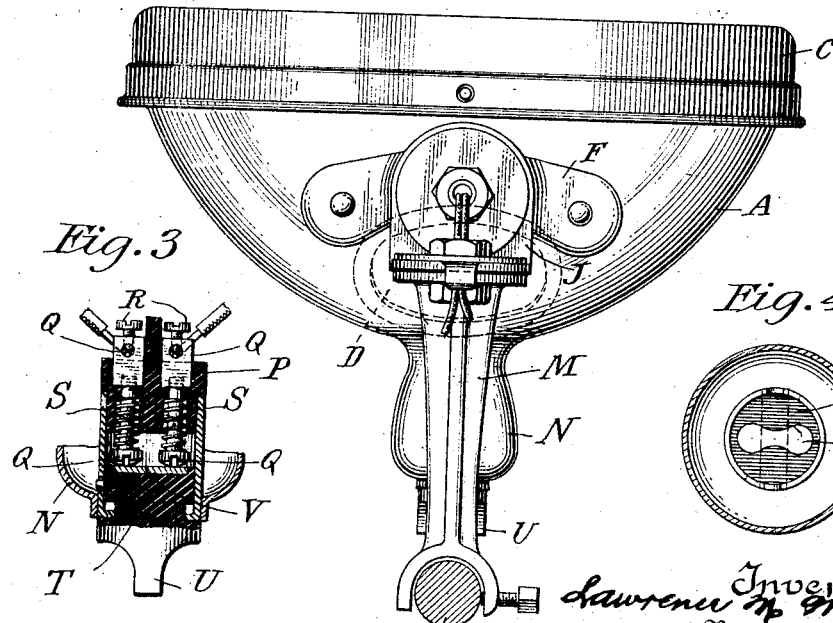
Figure 3:
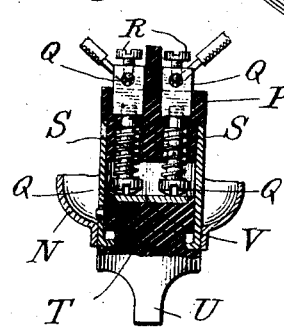
Figure 4:
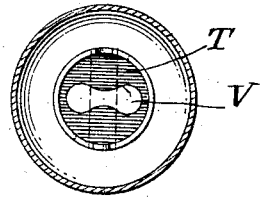

Figure 1 is a central sectional view of the device as a whole, exhibiting the construction of the same in a general way. Fig. 2 is a side view of the reflector casing and its means of support. Fig. 3 is a sectional detail of the switch and accompanying mechanism; and Fig. 4 is a plan view of the switch connector, the projection containing the same being shown in section.

The reflector proper is composed of an outer casing A and an inner silvered reflector B, held together by a detachable rim C. On one side and at the rear of casing A is a mirror D that may be set in the wall of the casing or otherwise attached thereto.

The casing is adapted to be secured to or mounted on a rod E forming part of the car body frame, or shield, as the case may be, by means of a bracket or arm F secured to the casing and connected by a swivel joint G, H to a right-angled part J, similarly swiveled at K, L, to an arm M by means of which the reflector is secured to the rod E. This manner of mounting the reflector makes it possible to adjust the same with reference to the car body, so that its light may be directed to any point that may be desired.

The central rear portion of the casing A is formed as a rounded extension or projection N that serves as a handle that may be grasped to turn the reflector to any desired position. In the hollow interior of this projection is secured by a bayonet joint O a cylinder containing an insulating body or plug P, containing two terminals Q adapted to receive the ends of circuit wires and provided with clamping screws R. Each terminal has a rod or pin portion extending therefrom and is surrounded by a spiral spring S that tends to draw down the terminal with its socket in the plug P.

In the bottom or end of the projector N is contained a connector of insulating material T adapted to be turned by a projecting key portion U, and carrying a metallic piece V which when the key is turned will be caused to bridge the ends of the spring seated terminals Q.

The central part of the reflector B has an opening in which is secured by a screw W a cup shaped piece X, carrying the lamp socket Y. This latter, as will be well understood, contains the usual terminals with which those of the lamp Z make contact when the lamp is inserted in place.

The circuit wires pass into the space between the casing A and reflector B, through openings in the swivel joints. One conductor connects directly to one of the terminals Q and the other terminal leads to a lamp terminal in the socket Y from the other terminal of which runs the second wire to the outside of the device. When, therefore, the key is turned to bridge the terminals Q the circuit through the lamp is made.

It has been found in commercial practice that the above described form of lamp and reflector has largely displaced all other cheap forms of this device and constitutes a most useful and convenient apparatus.

What I claim is:

1. An automobile lamp adapted to be pivotally attached to a car, comprising an outer metallic casing extended at its central rear portion to form a hollow handle to contain a switch, an inner reflector secured to the forward portion of the casing and having a central opening at the rear, and a lamp holder secured to the reflector around said opening.

2. An automobile lamp adapted to be pivotally attached to a car, comprising an outer casing extended at the central rear portion to form a hollow handle in combination with a lamp holder contained within the casing a switch therefor, in the hollow handle, and a switch button exterior to and located at the end of the handle.

3. An automobile lamp adapted to be pivotally attached to a car, comprising an outer casing, having a mirror secured to its back, and extended centrally in the rear to form a hollow handle, an inner reflector, a lamp holder within the casing carrying a lamp that projects through a central opening in the reflector, and a switch for a lamp contained in the handle.

4. An automobile lamp adapted to be pivotally attached to a car, comprising an outer metallic casing and an inner reflector secured together, a lamp holder secured to the reflector and adapted to carry a lamp projecting into the reflector through a central rear opening, and a hollow handle projecting from the central rear part of the casing and containing a switch for the lamp.

5. An automobile lamp adapted to be pivotally attached to a car, comprising a reflector casing and inner reflector secured thereto having a flanged opening at the center, a lamp holder in the form of a cup secured to the flange, the central rear portion of the casing projecting rearwardly and forming a handle, a lamp switch in said handle and a key for operating the same exterior to and at the rear end of said handle.

In testimony whereof I affix my signature in the presence of two subscribing witnesses.

LAWRENCE M. WOOD.

Witnesses:
M. H. MATSON,
G. H. WEAVER.